(12) United States Patent
Chen

(10) Patent No.: US 12,478,100 B2
(45) Date of Patent: Nov. 25, 2025

(54) ATOMIZING ASSEMBLY CONVENIENT TO ASSEMBLE AUTOMATICALLY, ATOMIZING DEVICE, AND MANUFACTURING METHOD THEREOF

(71) Applicant: Shenzhen Huachengda Precision Industry Co. Ltd., Guangdong (CN)

(72) Inventor: Ping Chen, Guangdong (CN)

(73) Assignee: Shenzhen Huachengda Precision Industry Co. Ltd., Shenzhen (CN)

( * ) Notice: Subject to any disclaimer, the term of this patent is extended or adjusted under 35 U.S.C. 154(b) by 425 days.

(21) Appl. No.: 18/013,267

(22) PCT Filed: Jun. 1, 2021

(86) PCT No.: PCT/CN2021/097774
§ 371 (c)(1),
(2) Date: Dec. 28, 2022

(87) PCT Pub. No.: WO2022/252129
PCT Pub. Date: Dec. 8, 2022

(65) Prior Publication Data
US 2023/0284697 A1  Sep. 14, 2023

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *A24F 40/485* (2020.01); *A24F 40/70* (2020.01); *H05B 3/22* (2013.01)

(58) Field of Classification Search
None
See application file for complete search history.

(56) References Cited

U.S. PATENT DOCUMENTS

2017/0095005 A1   4/2017 Monsees et al.
2021/0235756 A1*  8/2021 Qiu .................. A24F 40/40

FOREIGN PATENT DOCUMENTS

CN   110897200 A   3/2020
CN   111772242 A   10/2020
(Continued)

OTHER PUBLICATIONS

International Search Report of PCT Patent Application No. PCT/CN2021/097774 issued on Feb. 24, 2022.
(Continued)

*Primary Examiner* — Michael J Felton

(57) ABSTRACT

Disclosed are an atomizing assembly convenient to assemble automatically, an atomization device and a manufacturing method thereof. The atomizing assembly includes a heating assembly, a cover and a seat. The heating assembly includes a heating member including a heating portion and an electrical connecting portion. The cover is provided with an electrode connecting hole open longitudinally and configured for inserting an electrode. The electrical connecting portion extends into an inlet of the electrode connecting hole. The atomizing device includes a housing and the atomizing assembly. The manufacturing method of the atomizing assembly includes: assembling the heating assembly, the cover and the seat; inserting the electrode into the electrode connecting hole, and the electrode bending the electrical connecting portion into the electrode connecting hole. The atomizing assembly and the atomizing device are simple and reliable in structure, the strength between the components is good, and automatic assembly is very facilitated.

13 Claims, 12 Drawing Sheets

(51) Int. Cl.
  *A24F 40/44* (2020.01)
  *A24F 40/485* (2020.01)
  *A24F 40/70* (2020.01)
  *H05B 3/22* (2006.01)

(56) References Cited

FOREIGN PATENT DOCUMENTS

| | | |
|---|---|---|
| WO | 2016041209 A1 | 3/2016 |
| WO | 2020183780 A1 | 9/2020 |

OTHER PUBLICATIONS

Extended European Search Report of Counterpart European Patent Application No. 21943498.2 issued on Aug. 16, 2023.

* cited by examiner

A-A

ATOMIZING ASSEMBLY CONVENIENT TO ASSEMBLE AUTOMATICALLY, ATOMIZING DEVICE, AND MANUFACTURING METHOD THEREOF

FIELD

The present invention relates to the field of atomization, and more specifically, to an atomizing assembly convenient to assemble automatically, an atomizing device, and a manufacturing method thereof.

BACKGROUND

Generally, an atomizing assembly is a device for heating and atomizing a liquid, where the heating method is usually electrical heating. Currently, the atomizing device generally has a complex structure and a complex assembly method, making it difficult to realize an automatic assembly.

SUMMARY

A technical problem to be solved by the present invention is, in view of the above defects in the prior art, to provide an atomizing assembly convenient to assemble automatically, an atomizing device, and a manufacturing method thereof.

A technical solution adopted by the present invention to solve the technical problem includes: providing an atomizing assembly, including a heating assembly, a liquid conducting member, a cover and a seat, wherein the heating assembly includes a heating member, one of the cover and the seat is provided with an accommodating chamber open to the other one of the cover and the seat, the heating assembly and the liquid conducting member are disposed in the accommodating chamber, the liquid conducting member is in contact with the heating member, the seat is connected with the cover, the heating assembly is clamped between the cover and the seat, the heating member includes a heating portion configured for heating and atomizing a liquid and an electrical connecting portion connected with the heating portion and configured for electrical connection with an electrode, the heating member is transversely arranged, the electrical connecting portion extends outwards, the cover is provided with an electrode connecting hole open longitudinally and configured for an insertion of the electrode, and the electrical connecting portion extends transversely or obliquely into an inlet of the electrode connecting hole.

Preferably, the atomizing assembly includes an electrode, the electrode is inserted into the electrode connecting hole, and bends the electrical connecting portion into the electrode connecting hole along an opening edge of the electrode connecting hole, and the electrical connecting portion is electrically connected with a side surface of the electrode.

Preferably, a bottom portion of the cover is provided with the accommodating chamber open longitudinally, the accommodating chamber and the electrode connecting hole are located on a same side of the cover, the accommodating chamber includes a first portion configured for accommodating the liquid conducting member and a second portion configured for accommodating the heating assembly, the first portion and the second portion are connected with each other and arranged from deep to outside in turn; a position, in a second transverse direction, of a side wall of the second portion of the accommodating chamber is provided with an electrical connecting through port for the electrical connecting portion to protrude from inside to outside, and the electrode connecting hole is disposed outside the electrical connecting through port, so that the electrical connecting portion extends into an opening position of the electrode connecting hole through the electrical connecting through port.

Preferably, the seat is provided with an electrode through hole corresponding to the electrode connecting hole and extending longitudinally, and the electrode passes through the electrode through hole and is inserted into the electrode connecting hole.

Preferably, the electrode includes a head configured for electrically connecting with an external circuit and a rob configured for inserting into the electrode connecting hole, a radial dimension of the head is larger than a radial dimension of the rob, the rob passes through the electrode through hole and is inserted into the electrode connecting hole, and bends the electrical connecting portion into the electrode connecting hole along the opening edge of the electrode connecting hole, the electrical connecting portion is electrically connected with a side surface of the rod, and the head is exposed outside the seat.

Preferably, the heating assembly includes a reinforcing frame that is combined with the heating portion to support the heating portion, the electrical connecting portion extends out of the reinforcing frame, the reinforcing frame includes a transverse wall and a longitudinal wall surrounding the transverse wall, the heating member is combined with a top of the transverse wall, the longitudinal wall is disposed at a bottom of the transverse wall, the transverse wall is provided with a vent hole extending longitudinally, and the longitudinal wall is provided with a first air vent extending transversely, so that a gas generated by the heating member flows sequentially through the vent hole and the first air vent from inside to outside.

Preferably, the reinforcing frame is made of an insulating material, the reinforcing frame is irremovably combined with the heating member, or the reinforcing frame is detachably combined with the heating member.

Preferably, the atomizing assembly includes a liquid conducting member in contact with the heating portion, a transverse dimension of the liquid conducting member is comparable to a transverse dimension of the accommodating chamber, the reinforcing frame supports a bottom of the heating portion, and the liquid conducting member is disposed at a top of the heating portion.

Preferably, a transverse dimension of the heating portion is comparable to a transverse dimension of the reinforcing frame.

In the transverse direction, the dimension of the heating member is smaller than the dimension of the cover.

Preferably, a bottom of the cover is provided with the accommodating chamber open longitudinally, the accommodating chamber and the electrode connecting hole are located on a same side of the cover, the accommodating chamber includes a first portion configured for accommodating the liquid conducting member and a second portion configured for accommodating the heating assembly, the first portion and the second portion are connected with each other and arranged from deep to outside in turn; a position, in a first transverse direction, of a side wall of the second portion of the accommodating chamber is provided with a second air vent extending transversely, and the second air vent corresponds to the first air vent, so that a gas generated by the heating member flows through the first air vent and the second air vent in turn from inside to outside.

Preferably, an outer side of the cover is provided with a third air vent extending longitudinally, so that the gas generated by the heating member flows through the first air vent, the second air vent and the third air vent in turn.

Preferably, the seat is provided with a fourth air vent, and the fourth air vent corresponds to the second air vent and is connected with the third air vent, so that the gas generated by the heating member flows through the first air vent, the second air vent, the fourth air vent and the third air vent in turn.

Preferably, a top of the cover is provided with an air passage communicating to the third air vent, so that the gas generated by the heating member flows through the first air vent, the second air vent, the third air vent and the air passage in turn.

Preferably, the atomizing assembly includes a first sealing member covering a top of the cover and provided with a fifth air vent, the fifth air vent corresponds to the air passage and is connected with the third air vent, so that the gas generated by the heating member flows through the first air vent, the second air vent, the third air vent and the fifth air vent in turn.

Preferably, the first air vent, the second air vent, the third air vent, the fourth air vent and/or the fifth air vent are notch shaped.

The technical solution adopted by the present invention to solve the technical problem includes: providing an atomizing device, including a housing and the atomizing assembly disposed in the housing, wherein the atomizing assembly includes a liquid conducting member in contact with the heating portion, the housing is provided with a liquid conveying structure and an air outlet structure, the liquid conveying structure is communicated to the liquid conducting member, so that the liquid flows to the liquid conducting member through the liquid conveying structure, the liquid conducting member conducts the liquid to the heating member for heating and atomizing to generate the gas, and the gas flows out through the air outlet structure.

The technical solution adopted by the present invention to solve the technical problem includes: providing a manufacturing method of the atomizing assembly, including the following steps:

S1, combining the cover with the seat, and clamping the liquid conducting member and the heating assembly between the cover and the seat, to make the heating member and the liquid conducting member in close contact;

S2, inserting the electrode into the electrode connecting hole, and the electrode bending the electrical connecting portion into the electrode connecting hole and electrically connecting with the electrical connecting portion.

Preferably, the bottom of the cover is provided with an accommodating chamber open longitudinally, the accommodating chamber includes a first portion configured for accommodating the liquid conducting member and a second portion configured for accommodating the heating assembly, and the first portion and the second portion are connected with each other and arranged from deep to outside in turn;

the step S1 includes: placing the liquid conducting member into the first portion of the accommodating chamber, placing the heating assembly into the second portion of the accommodating chamber, combining the cover with the seat, and the seat abutting against the heating assembly to make the heating member and the liquid conducting member in close contact.

Preferably, the seat is provided with an electrode through hole corresponding to the electrode connecting hole and extending longitudinally, the step S2 includes: the electrode passing through the electrode through hole from a bottom side of the seat and extending into the electrode connecting hole.

The technical solution adopted by the present invention to solve the technical problem includes: providing a manufacturing method of the atomizing device, including the following steps:

S3, connecting the cover of the atomizing assembly with the first sealing member, and connecting the seat with the second sealing member;

S4, placing the atomizing assembly into the housing, and the sealing members forming a seal between an outer side of the atomizing assembly and an inner wall of the housing.

Implementation of the present invention provides at least the following beneficial effects: the atomizing assembly and the atomizing device are simple and reliable in structure, the strength between the components is good, the dimensional tolerance can be very accurate, and automatic assembly is very facilitated; the manufacturing methods of the atomizing assembly and the atomizing device are simple and reliable, and are very beneficial to automatic assembly.

BRIEF DESCRIPTION OF THE DRAWINGS

Subject matter of the present invention will be described in even greater detail below based on the exemplary figures, and in the accompanying drawings.

Figure 1:
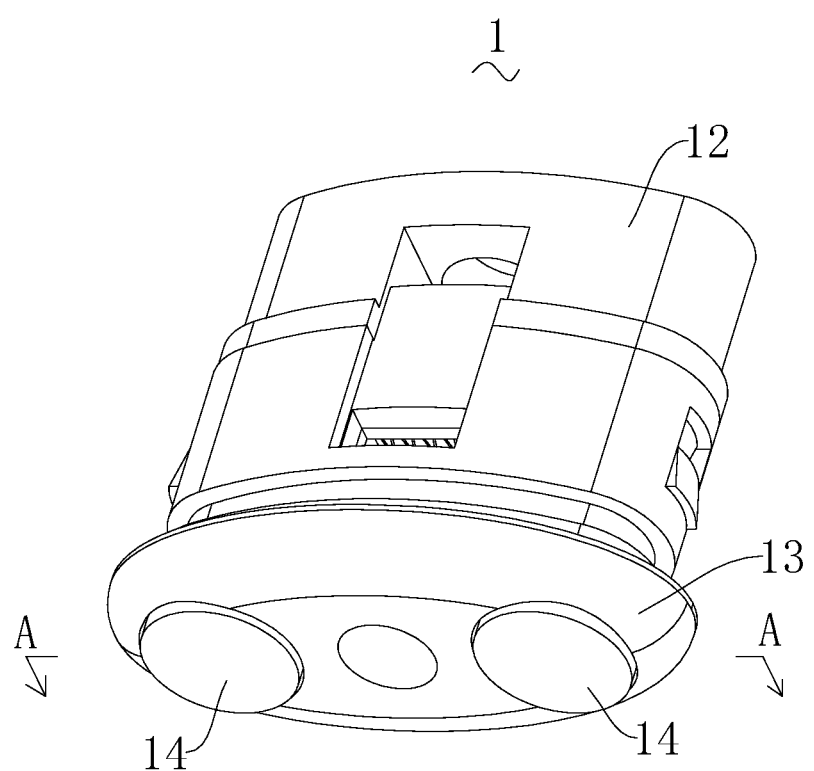
FIG. 1 is a perspective view of an atomizing assembly in an embodiment of the present invention.
Figure 2:
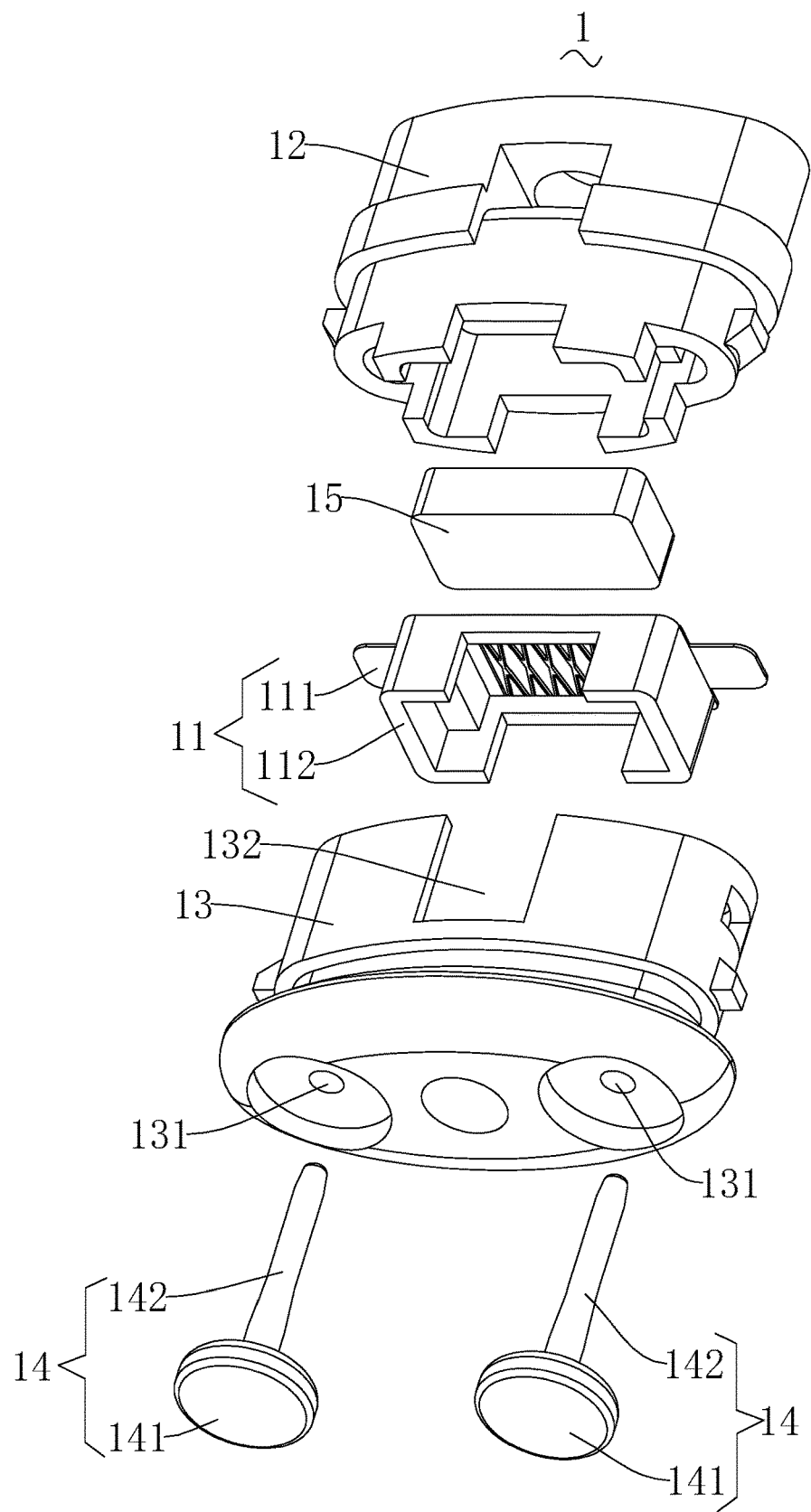
FIG. 2 is an exploded view of the atomizing assembly in FIG. 1.

Wherein, the reference marks in the drawings represent: atomizing assembly 1, heating assembly 11, heating member 111, heating portion 1111, electrical connecting portion 1112, reinforcing frame 112, transverse wall 1121, longitudinal wall 1122, vent hole 1123, first air vent 1124, cover 12, base 121, positioning portion 122, accommodating chamber 123, first portion 1231, second portion 1232, electrode connecting hole 124, electrical connecting through port 125, second air vent 127, third air vent 128, air passage 129, seat 13, electrode through hole 131, fourth air vent 132, electrode 14, head 141, rod 142, liquid conducting member 15, housing 2, air outlet passage 22, liquid storage chamber 21, first sealing member 3, fifth air vent 31, second sealing member 4, first transverse direction a, second transverse direction b.

DETAILED DESCRIPTION

For better understanding of the technical features, objects and effects of the present invention, the specific embodiments of the present invention will be described in detail with reference to the accompanying drawings. In the description of the present invention, it should be understood that directions or location relationships indicated by terms "front", "rear", "upper", "lower", "left", "right", "longitudinal", "transverse", "vertical", "horizontal", "top", "bottom", "inner", "outer", "head", "tail" and the like are based on the directions or location relationships shown in the accompanying drawings, or the directions or location relationships that are usually placed or operated when the product is used, and are merely used for the convenience of describing the present invention, but are not used to indicate or imply that a device or an element needs to have a particular direction or be constructed and operated in a particular direction, and therefore, cannot be understood as a limitation to the present invention. It is further noted that, in the present invention, unless specified or limited otherwise, the terms "mounted", "connected", "coupled", "fixed", "arranged" and the like should be understood in a broad sense, for example, the connection may be a fixed connection, a detachable connection, or an integral connection; or the connection may be a direct connection, or an indirect connection through an intermediary, or the connection may be an internal communication between two elements or a mutual action relationship between two elements, unless otherwise specified explicitly. When one element is described to be located "above" or "under" another element, it means that the element may be "directly" or "indirectly" located above or under another element, or there may be one or more intervening element located therebetween. The terms "first", "second", "third" and the like are only used for the convenience of describing the technical solution, and cannot be understood as indicating or implying the relative importance or implicitly indicating the number of the indicated technical features. Therefore, features defined with "first", "second", "third", etc. may explicitly or implicitly indicates that one or more of these features may be included. For those of ordinary skill in the art, the specific meaning of the above-mentioned terms in the present invention can be understood according to specific circumstances.

In the description hereinbelow, for purposes of explanation rather than limitation, specific details such as specific systematic architectures and techniques are set forth in order to provide a thorough understanding of the embodiments of the present invention. However, it should be apparent to persons skilled in the art that the present invention may also be implemented in absence of such specific details in other embodiments. In other instances, detailed descriptions of well-known systems, devices, circuits, and methods are omitted so as not to obscure the description of the present invention with unnecessary detail.

Figure 3:
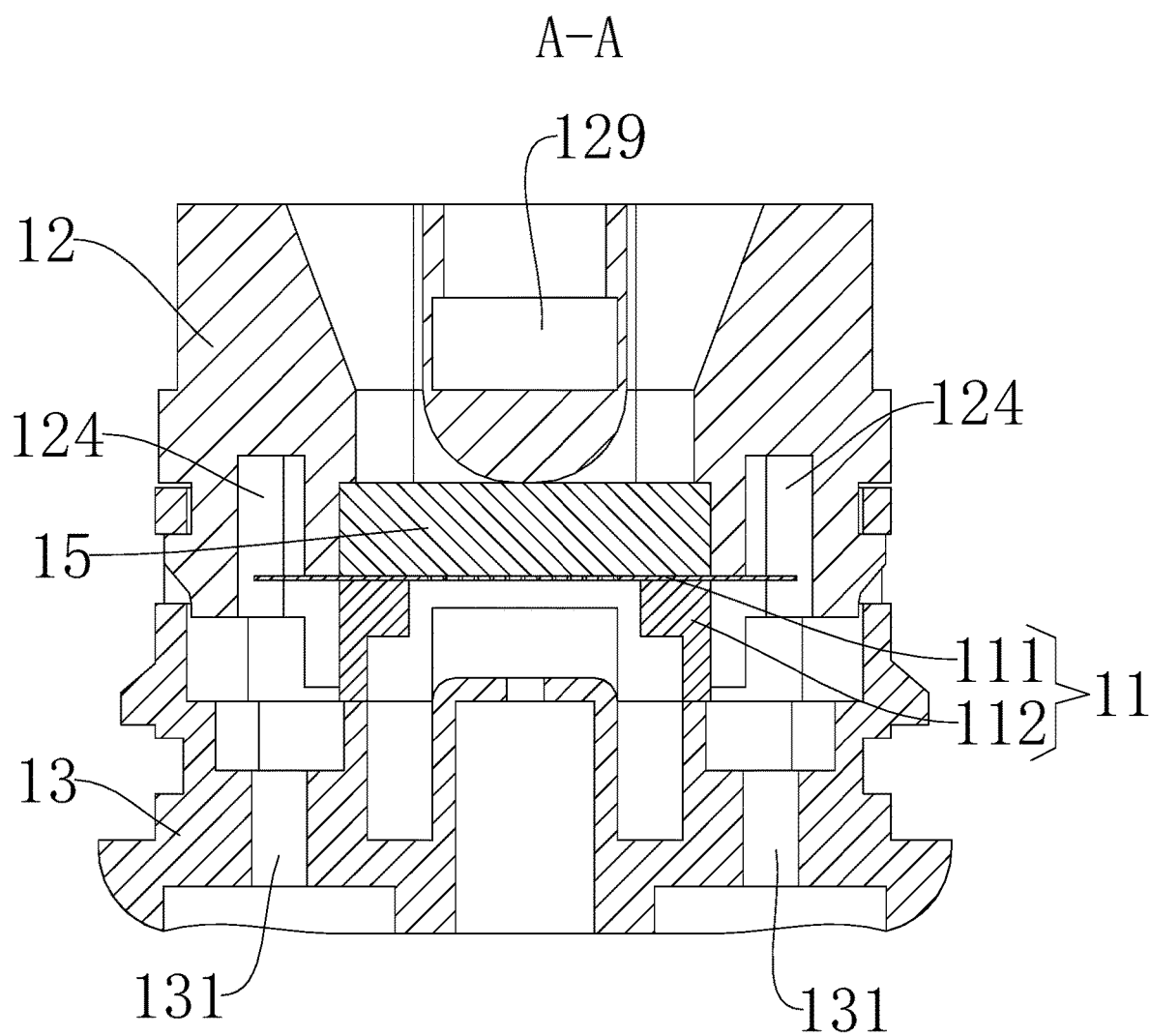
FIG. 3 is a sectional view at the position A-A FIG. 1 (wherein the electrodes are omitted)

As shown in FIG. 1 to FIG. 9, an atomizing assembly 1 in an embodiment of the present invention includes a heating assembly 11, a cover 12, a liquid conducting member 15 and a seat 13. The heating assembly 11 includes a heating member 111 that is sheet shaped. One of the cover 12 and the seat 13 is provided with an accommodating chamber 123 open to the other of the cover 12 and the seat 13. The heating assembly 11 and the liquid conducting member 15 are disposed in the accommodating chamber 123. The liquid conducting member 15 contacts the heating member 111, the seat 13 is connected with the bottom of the cover 12, and the heating assembly 11 is clamped between the cover 12 and the seat 13. The heating member 111 includes a heating portion 1111 configured for heating and atomizing a liquid and an electrical connecting portion 1112 that is connected with the heating portion 1111 and configured for electrical connection with an electrode. The heating member 111 is arranged on the cover 12 transversely, and the electrical connecting portion 1112 extends outward. The bottom of the cover 12 is provided with an electrode connecting hole 124 that is open longitudinally and configured for the insertion of an electrode 14, and the electrical connecting portion 1112 of the heating member 111 extends transversely or obliquely into the inlet of the electrode connecting hole 124 (see FIG. 3), so that when the electrode 14 is inserted into the electrode connecting hole 124, the electrode 14 bends the electrical connecting portion 1112 into the electrode connecting hole 124 and is electrically connected with the electrical connecting portion 1112. The bent portion of the electrical connecting portion 1112 is located between a side wall of the electrode connecting hole 124 and the electrode 14 (see FIGS. 4 to 5 and FIG. 10). FIG. 3 shows an embodiment in which the electrical connecting portion 1112 of the heating member 111 extends transversely into the inlet of the electrode connecting hole 124.

In the atomizing assembly 1, the strength of the heating member 111 is improved through the support of the reinforcing frame 112, and the electrode 14 can be electrically connected with the electrical connecting portion 1112 of the heating member 111 conveniently and reliably.

Figure 4:
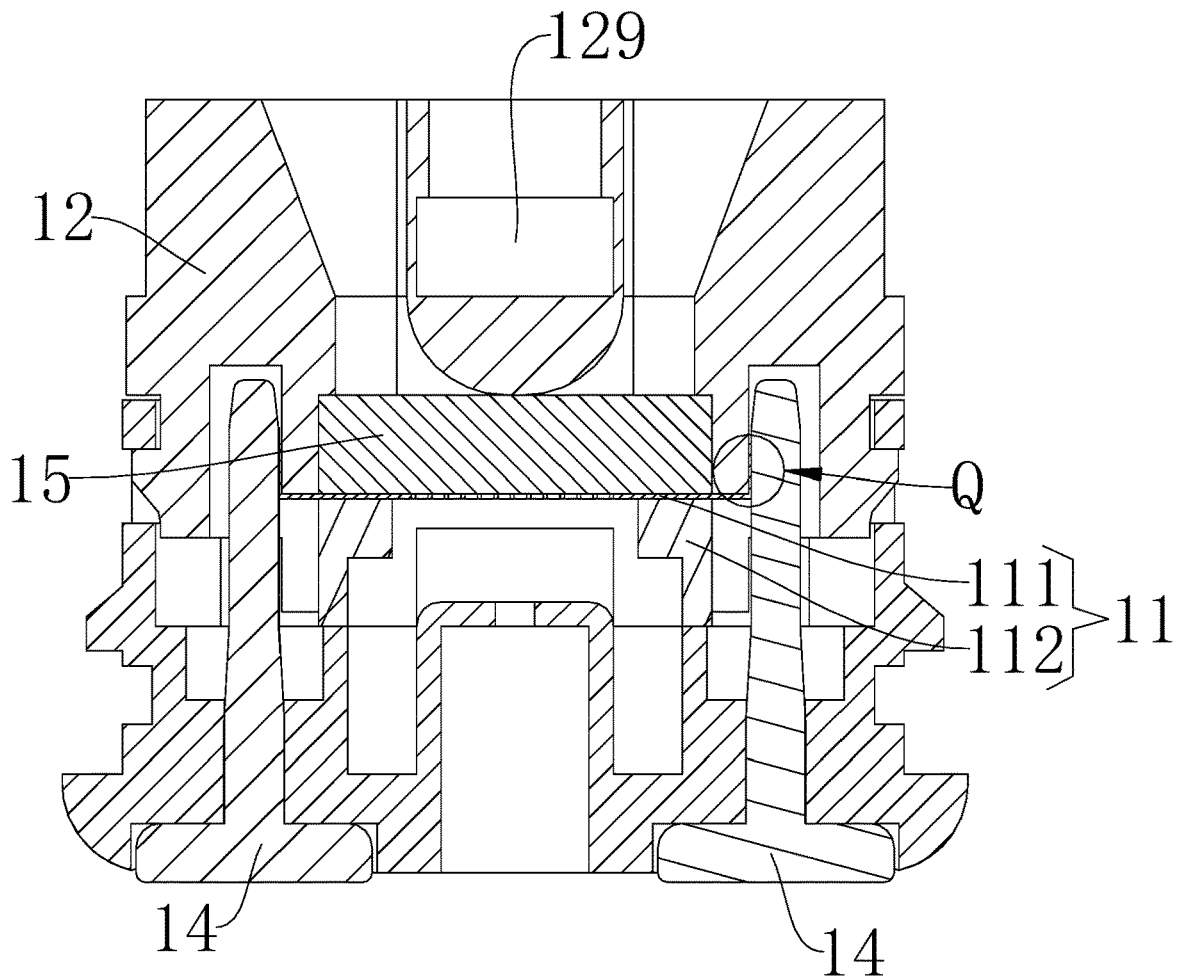
FIG. 4 is another sectional view at the position A-A of FIG. 1.
Figure 5:
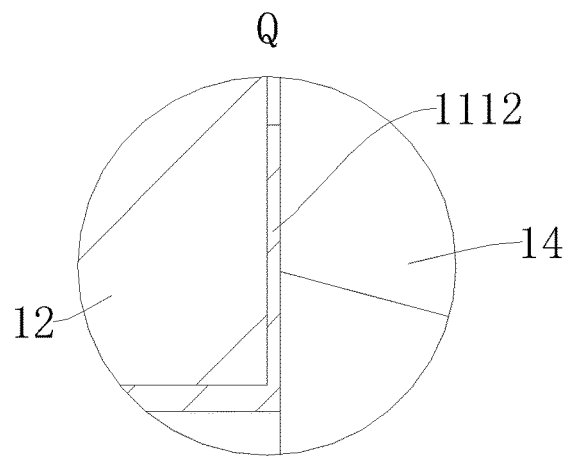
FIG. 5 is a partial enlarged view of the part Q in FIG. 4.
Figure 6:
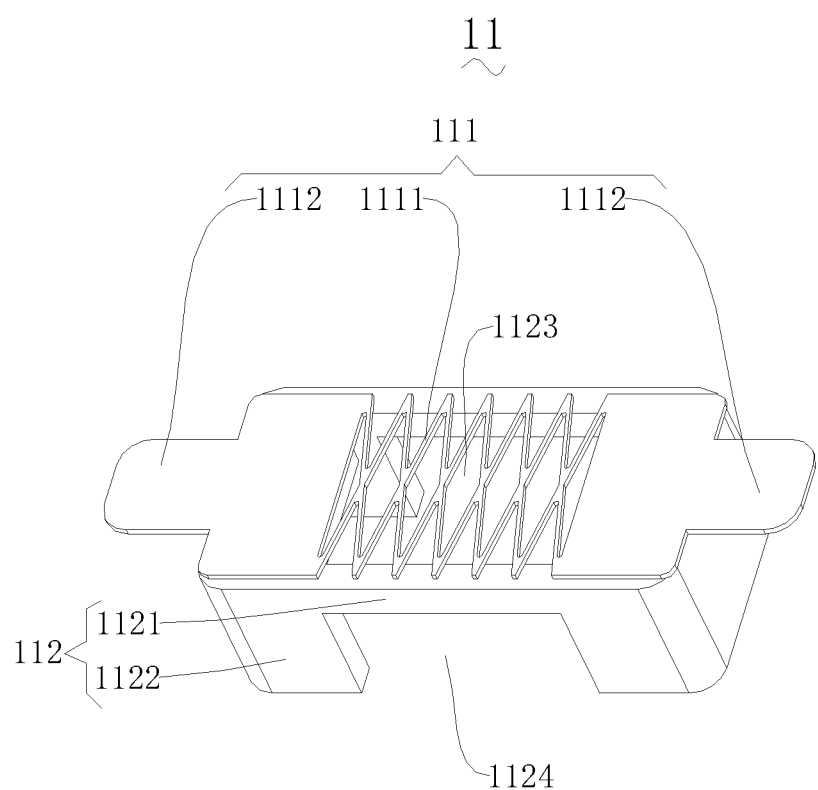
FIG. 6 is a stereoscopic view of the heating assembly of the atomizing assembly in FIG. 2.
Figure 7:
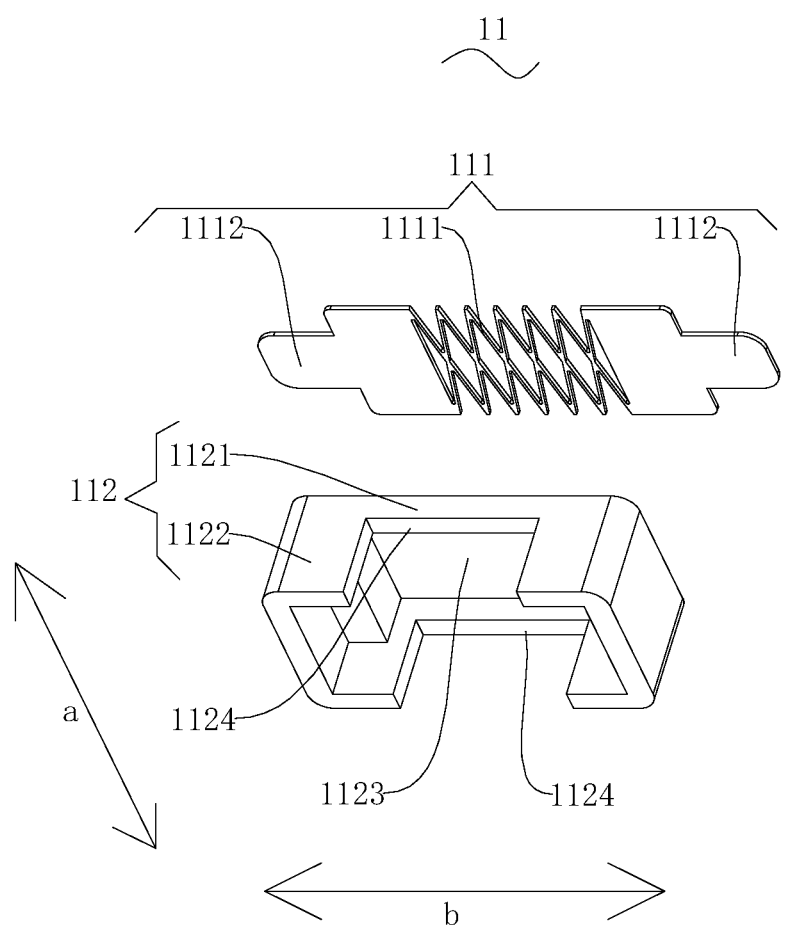
FIG. 7 is an exploded view of the heating assembly in FIG. 5.
Figure 8:
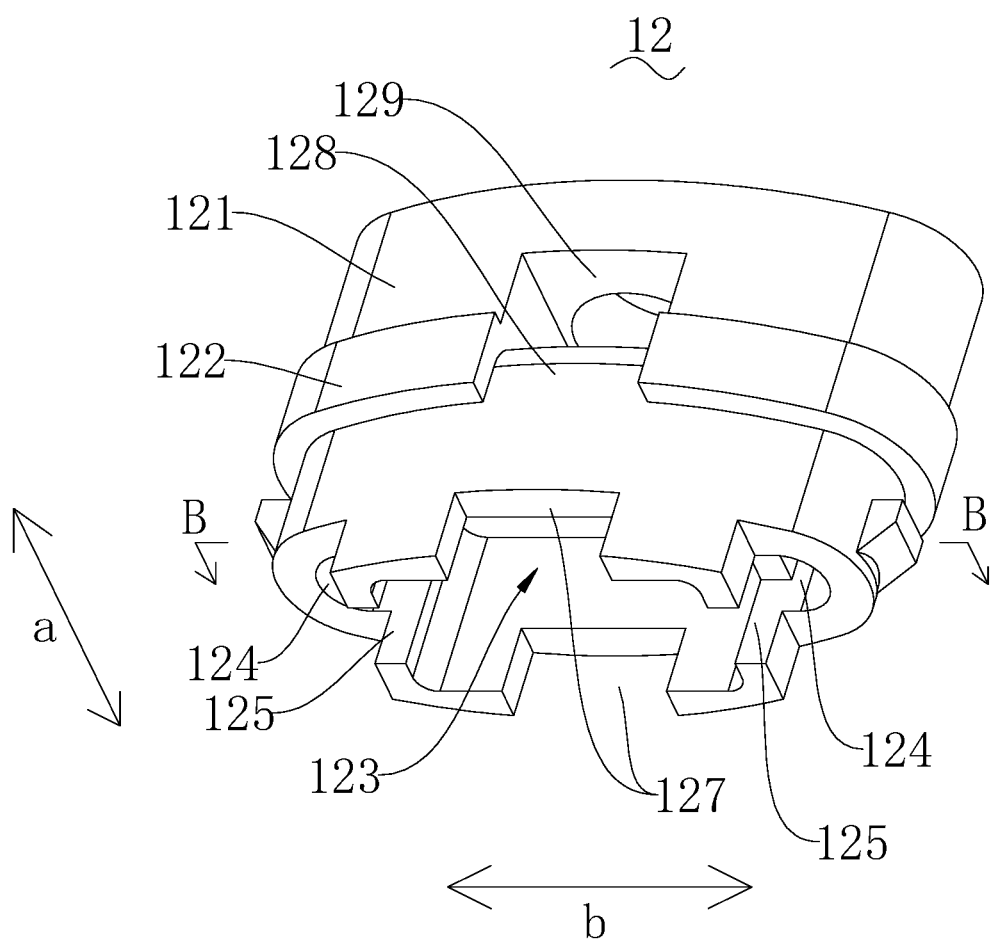
FIG. 8 is a stereoscopic view of the cover of the atomizing assembly in FIG. 2.
Figure 9:
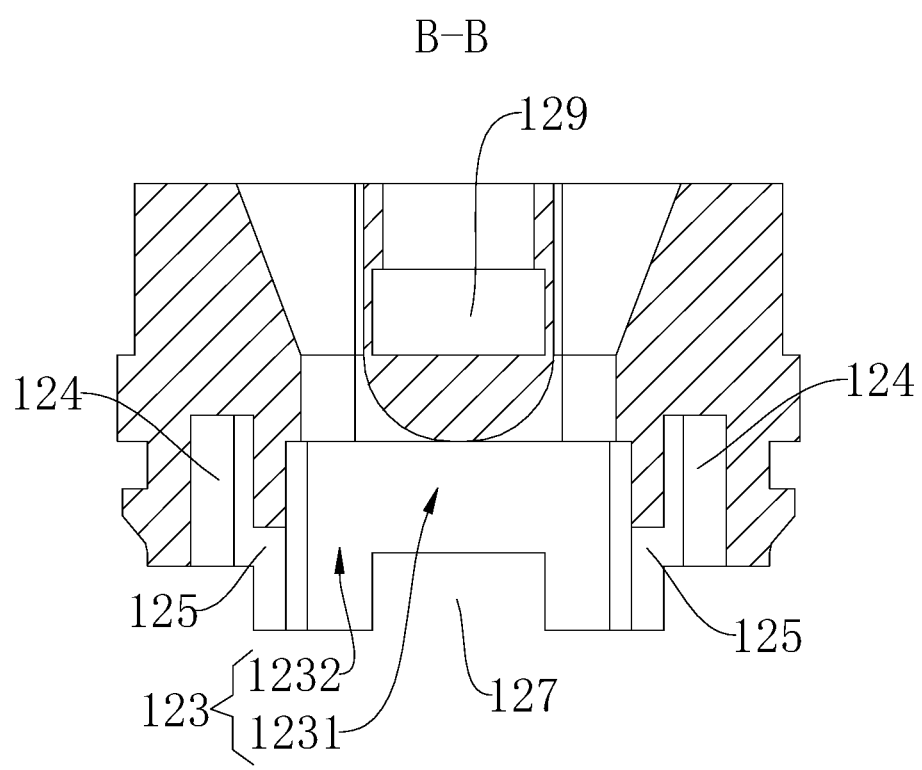
FIG. 9 is a sectional view at the position B-B in FIG. 7.
Figure 10:
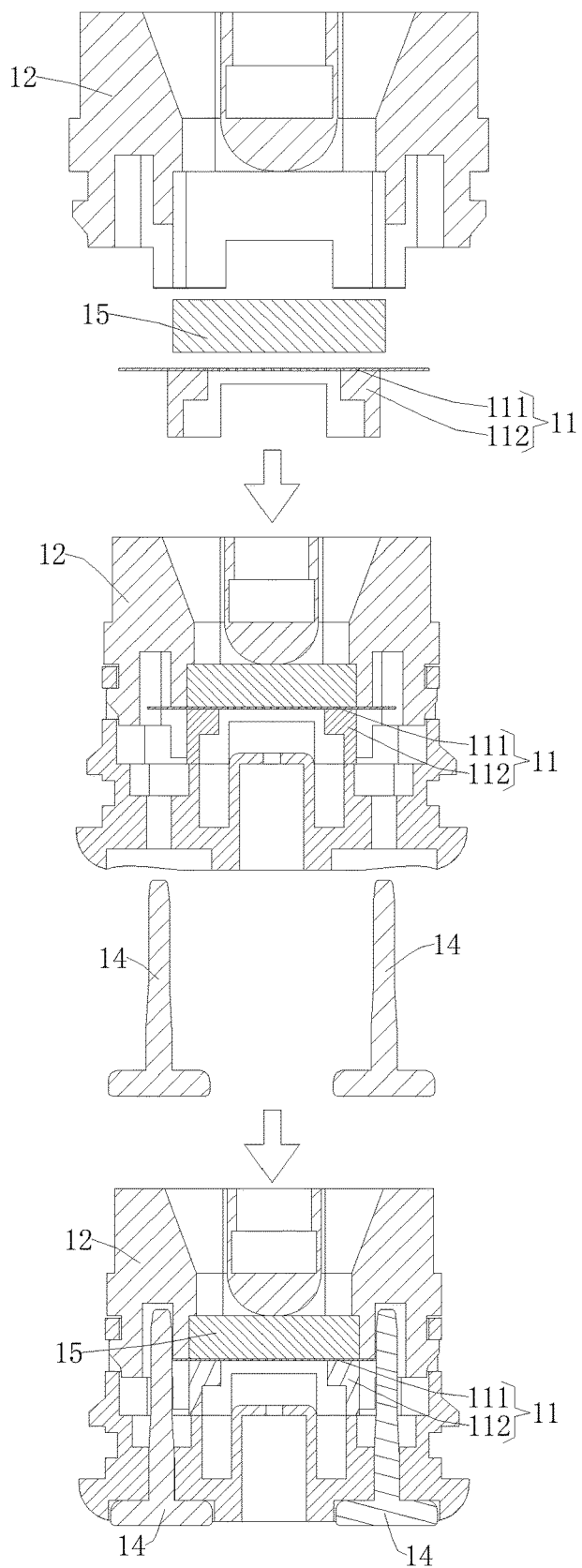
FIG. 10 is a process diagram of a manufacturing method of the atomizing assembly in an embodiment of the present invention (wherein the sectional position is the position A-A in FIG. 1)

As shown in FIG. 4 to FIG. 5 and FIG. 10, the atomizing assembly 1 includes an electrode 14, which is inserted into the electrode connecting hole 124 and bends the electrical connecting portion 1112 of the heating member 111 into the electrode connecting hole 124 along the opening edge of the electrode connecting hole 124. The bent portion of the electrical connecting portion 1112 is located between the side wall of the electrode connecting hole 124 and the side surface of the electrode 14, and the electrical connecting portion 1112 is electrically connected with the side surface of the electrode 14.

The bottom of the cover 12 is provided with a accommodating chamber 123 that is open longitudinally. The accommodating chamber 123 and the electrode connecting hole 124 are arranged on a same side of the cover 12. The accommodating chamber 123 includes a first portion 1231 configured for accommodating the liquid conducting member 15 and a second portion 1232 configured for accommodating the heating assembly 11. The first portion 1231 and the second portion 1232 are connected with each other and arranged from the deep to the outside in turn. A position, in a second transverse direction b, of a side wall of the second portion 1232 of the accommodating chamber 123 is provided with an electrical connecting through port 125 for the electrical connecting portion 1112 of the heating member 111 to extend from the inside to the outside, and the electrode connecting hole 124 is disposed outside the electrical connecting through port 125, so that the electrical connecting portion 1112 of the heating member 111 extends into the opening position of the electrode connecting hole 124 through the electrical connecting through port 125. Preferably, the heating member 111 has two electrical connecting portions 1112 that are symmetrically disposed, and the numbers respectively of the electrical connecting through ports 125, the electrodes 14, and the electrode connecting holes 124 are also two, corresponding to the two electrical connecting portions 1112.

The seat 13 is connected with the bottom of the cover 12. The seat 13 is provided with an electrode through hole 131 corresponding to the electrode connecting hole 124 and extending longitudinally. The electrode 14 passes through the electrode through hole 131 from the bottom side of the seat 13 and is inserted into the electrode connecting hole 124.

Referring to FIG. 4, FIG. 5 and FIG. 10, the electrode 14 includes a head 141 configured for electrical connection with an external circuit and a rob 142 configured for inserting into the electrode connecting hole 124, and the radial dimension of the head 141 is larger than that of the rob 142. The rob 142 is inserted into the electrode connecting hole 124 after passing through the electrode through hole 131, and bends the electrical connecting portion 1112 into the electrode connecting hole 124 along the opening edge of the electrode connecting hole 124. The bent portion of the electrical connecting portion 1112 is located between the side wall of the electrode connecting hole 124 and the side surface of the rob 142, and the electrical connecting portion 1112 is electrically connected with the side surface of the rob 142. The head 141 is exposed outside the seat 13, and the head 141 of the electrode 14 can be used to contact a charger of the atomizing assembly 1 for charging.

The heating assembly 11 includes a reinforcing frame 112, which is combined with the heating portion 1111 to support the heating portion 1111. The electrical connecting portion 1112 extends out of the reinforcing frame 112. The reinforcing frame 112 includes a transverse wall 1121 and a longitudinal wall 1122 surrounding the transverse wall 1121 along a periphery of the transverse wall 1121. The sheet-like heating member 111 is flatly combined with the top of the transverse wall 1121, and the longitudinal wall 1122 is disposed at the bottom of the transverse wall 1121, that is, the heating member 111 and the longitudinal wall 1122 are located at two opposite sides of the transverse wall 1121 in the longitudinal direction. The transverse wall 1121 is provided with a vent hole 1123 extending longitudinally, and the longitudinal wall 1122 is provided with a first air vent 1124 extending transversely, so that the gas generated by the heating member 111 flows sequentially through the vent hole 1123 and the first air vent 1124 from the inside to the outside.

The reinforcing frame 112 is made of an insulating material, and the reinforcing frame 112 is irremovably combined with the heating member 111, or the reinforcing frame 112 is detachably combined with the heating member 111.

The atomizing assembly 1 includes a liquid conducting member 15 in contact with the heating portion 1111 of the heating member 111. The liquid conducting member 15 is used to conduct the liquid to the heating portion 1111 of the heating member 111 for heating and atomizing, meanwhile, its microporous structure can prevent a liquid leakage according to the principle of negative pressure when the liquid is full. A transverse dimension of the liquid conducting member 15 is comparable to, and preferably equal to, a transverse dimension of the accommodating chamber 123. The informing frame 112 supports the bottom of the heating portion 1111 of the heating member 111, and the liquid conducting member 15 is disposed at the top of the heating portion 1111. The liquid conducting member 15 may be a multi-layer structure superimposed with different fibers or may be an integrated cotton, or may be a multi-layer non-woven fabric, or linen cotton or cosmetic cotton. Preferably, the liquid conducting member 15 is flat, and a dimension of the first portion 1231 of the accommodating chamber 123 of the cover 12 is comparable to a dimension of the liquid conducting member 15.

The transverse dimension of the heating portion 1111 of the heating member 111 is comparable to, and preferably equal to, the transverse dimension of the reinforcing frame 112. The electrical connecting portion 1112 extends out of the reinforcing frame 112.

In the second transverse direction b, the dimension of the heating member 111 is smaller than the dimension of the cover 12, but larger than the dimension of the reinforcing frame 112.

The bottom of the cover 12 is provided with an accommodating chamber 123 open longitudinally. The accommodating chamber 123 and the electrode connecting hole 124 are located on a same side of the cover 12. The accommodating chamber 123 includes a first portion 1231 for accommodating the liquid conducting member 15 and a second portion 1232 for accommodating the heating assembly 11. The first portion 1231 and the second portion 1232 are connected with each other and disposed from the deep to the outside in turn. A position, in a first transverse direction a, of a side wall of the second portion 1232 of the accommodating chamber 123 is provided with a second air vent 127 extending transversely. The position and the shape of the second air vent 127 correspond to the position and the shape of the first air vent 1124, so that the gas generated by the heating member 111 flows sequentially through the first air vent 1124 and the second air vent 127 from the inside to the outside.

A position, in the first transverse direction a, of an outer side of the cover 12 is provided with a third air vent 128 extending longitudinally. Preferably, the cover 12 includes a base 121 and a positioning portion 122 that is disposed and protrudes from the base 121 and surrounds a lateral surface of the base 121 transversely. The electrical connecting through port 125 runs through the positioning portion 122 longitudinally, so that the gas generated by the heating member 111 can flow through the first air vent 1124, the second air vent 127 and the third air vent 128 sequentially.

The seat 13 is provided with a fourth air vent 132, and the lower part of the fourth air vent 132 corresponds to the second air vent 127 and is connected with the third air vent 128, so that the gas generated by the heating member 111 flows through the first air vent 1124, the second air vent 127, the fourth air vent 132 and the third air vent 128 sequentially.

The top of the cover 12 is provided with an air passage 129 communicating to the third air vent 128. The air passage 129 is communicated from the top to a position on a side of the cover 12 corresponding to the third air vent 128, so that the gas generated by the heating member 111 flows through the first air vent 1124, the second air vent 127, the fourth air vent 132, the third air vent 128 and the air passage 129 sequentially.

The atomizing assembly 1 includes a first sealing member 3, which is preferably made of a silica gel. The first sealing member 3 covers the top of the cover 12, and is provided with a fifth air vent 31. The fifth air vent 31 corresponds to the air passage 129 and is connected with the third air vent 128, so that the gas generated by the heating member 111 can flow through the first air vent 1124, the second air vent 127, the fourth air vent 132, the third air vent 128, the fifth air vent 31 and the air passage 129 sequentially.

The first air vent 1124, the second air vent 127, the third air vent 128, the fourth air vent 132 and/or the fifth air vent 31 are notch shaped.

In summary, the structure of the atomizing assembly 1 is simple and reliable, the strength between the components is good, the dimensional tolerance can be very accurate, and automatic assembly is facilitated.

Figure 11:
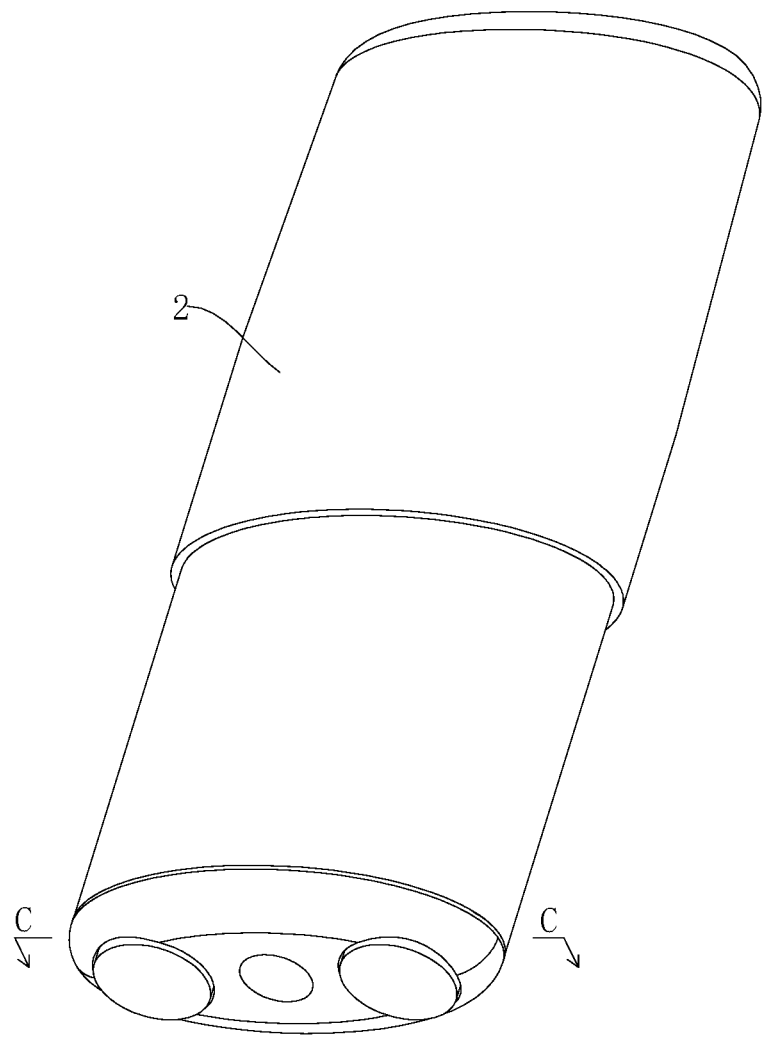
FIG. 11 is a perspective view of an atomizing device in an embodiment of the present invention.
Figure 12:
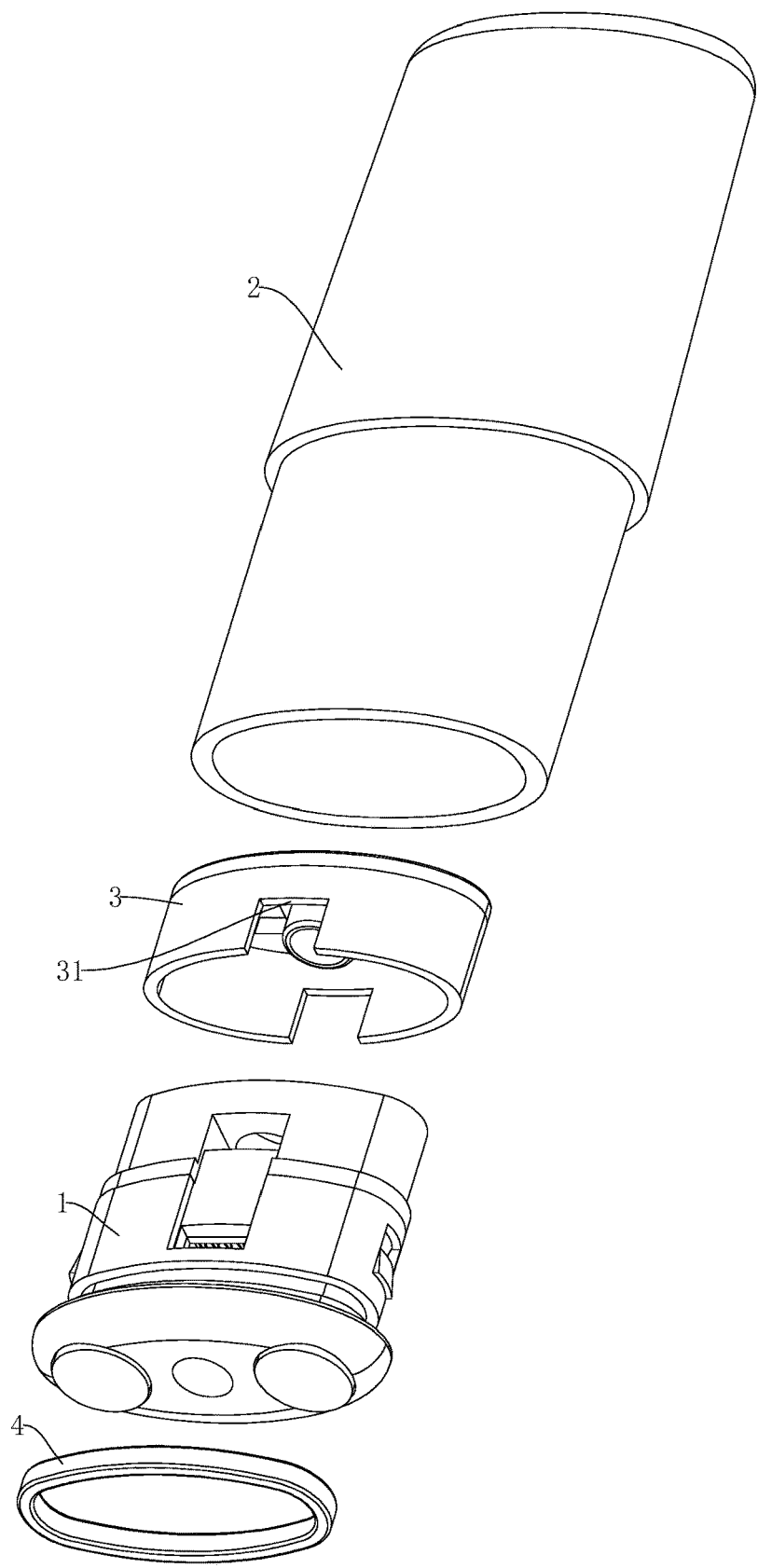
FIG. 12 is an exploded view of the atomizing device in FIG. 10.
Figure 13:
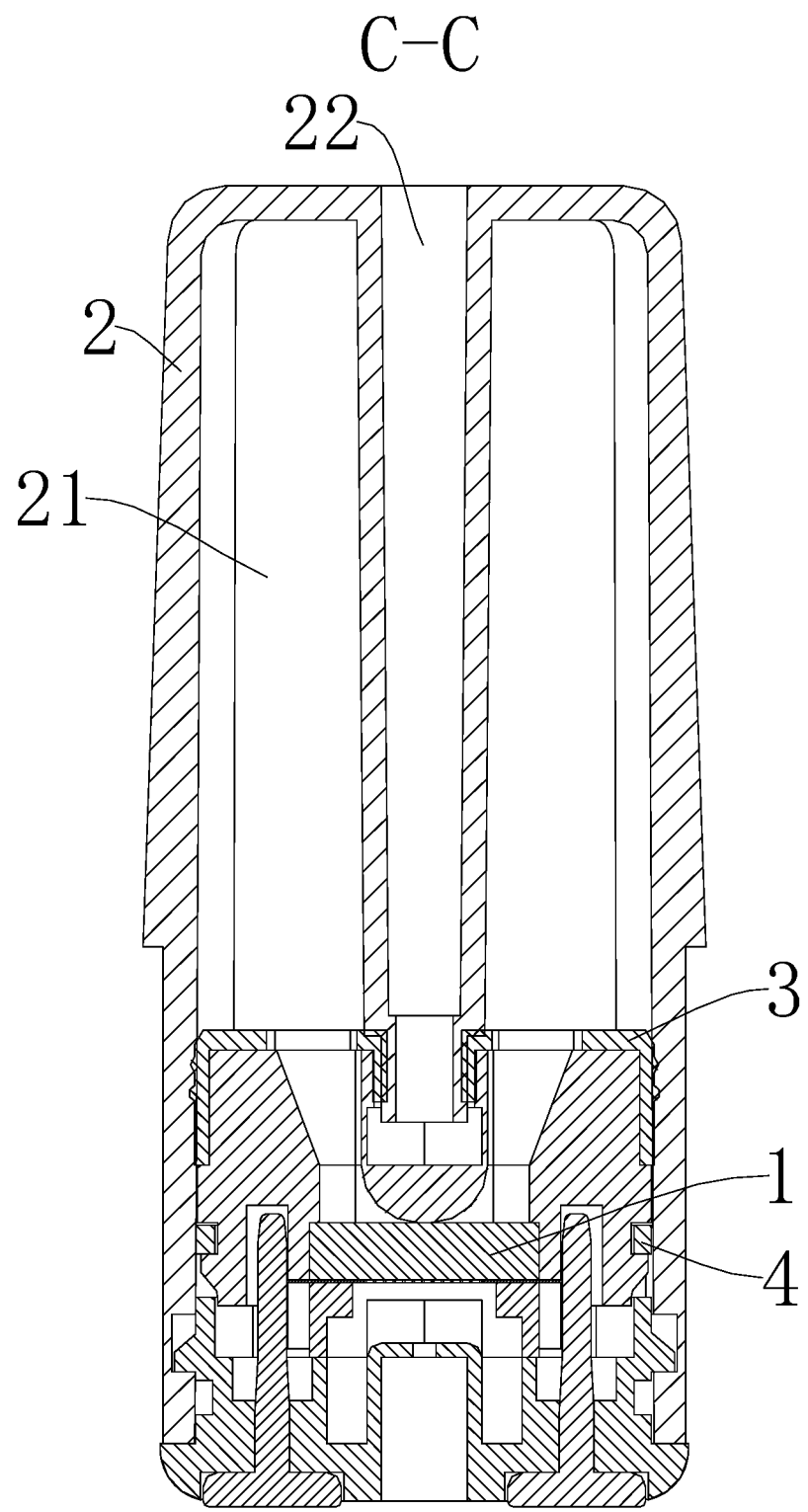
FIG. 13 is a sectional view at the position C-C in FIG. 10.

Referring to FIG. 11 to FIG. 13, an atomizing device in an embodiment of the present invention includes a housing 2 and the atomizing assembly 1 disposed in the housing 2. The atomizing assembly 1 includes a liquid conducting member 15 in contact with the heating portion 1111 of the heating member 111. The housing 2 is provided with a liquid conveying structure and an air outlet structure, and the liquid conveying structure is communicated to the liquid conducting member 15, so that the liquid flows to the liquid conducting member 15 through the liquid conveying structure in turn, and the liquid conducting member 15 conducts the liquid to the heating member 111 for heating and atomizing to generate a gas, which flows out through the air outlet structure. Preferably, the liquid conveying structure includes a liquid storage chamber 21, and the air outlet structure includes an air outlet passage 22 communicated with the air passage 129 on the top of the cover 12.

In summary, since the atomizing device adopts the above-mentioned atomizing assembly 1, the structure is simple and reliable, the strength between the components is good, the dimensional tolerance can be very accurate, and an automatic assembly is facilitated.

Referring to FIG. 10, a manufacturing method of the atomizing assembly 1 in an embodiment of the present invention, configured to manufacture the above-mentioned atomizing assembly, includes the following steps:

S1, combining the cover 12 and the seat 13, and clamping the liquid conducting member 15 and the heating assembly 11 between the cover 12 and the seat 13, to make the heating member 111 and the liquid conducting member 15 contact tightly; and S2, inserting the electrode 14 into the electrode connecting hole 124, the electrode 14 bending the electrical connecting portion 1112 of the heating member 111 into the electrode connecting hole 124 and electrically connecting with the electrical connecting portion 1112, so that the bent portion of the electrical connecting portion 1112 is located between the side wall of the electrode connecting hole 124 and the electrode 14, the electrode 14 is clamped tightly by the side surface of the electrode 14 and the side wall of the electrode connecting hole 124.

The manufacturing method of the atomizing assembly utilizes the structure of the atomizing assembly 1, the electrode 14 can be electrically connected with the electrical connecting portion 1112 of the heating member 111 easily and reliably, the method is simple and reliable, the strength between the components is good, the dimensional tolerance can be very accurate, which is very conducive to automatic assembly.

The bottom of the cover 12 is provided with an accommodating chamber 123 open longitudinally. The accommodating chamber 123 includes a first portion 1231 for accommodating the liquid conducting member 15 and a second portion 1232 for accommodating the heating assembly 11. The first portion 1231 and the second portion 1232 are connected with each other and arranged from the deep to the outside in turn.

Preferably, the step S1 includes: placing the liquid conducting member 15 in the first portion 1231 of the accommodating chamber 123, placing the heating assembly 11 in the second portion 1232 of the accommodating chamber 123, and the mesh structure of the heating portion 1111 of the heating member 111 restricting the liquid conducting cotton from coming out of the accommodating chamber 123, combining the cover 12 with the seat 13, wherein the combining manner may be connected by clamping, or by glue bonding or ultrasonic welding; an upper supporting position of the seat 13 abuts against the reinforcing frame 112 of the heating assembly 11 to make the heating member 111 and liquid conducting member 15 contact tightly.

The seat 13 is provided with an electrode through hole 131 extending longitudinally and corresponding to the electrode connecting hole 124.

The step S2 includes: the electrode 14 passing through the electrode through hole 131 from the bottom side of the seat 13 and extending into the electrode connecting hole 124.

Referring to FIG. 10 and FIG. 12, a manufacturing method of an atomizing device in an embodiment of the present invention, configured to manufacture the above-mentioned atomizing device, includes the above-mentioned manufacturing method of the atomizing assembly, and further includes the following steps:

S3, connecting the atomizing assembly 1 with the sealing members; specifically, the sealing members including the first sealing member 3 and the second sealing member 4, connecting the cover 12 of the atomizing assembly 1 with the first sealing member 3, and connecting the seat 13 with the second sealing member 4, wherein the second sealing member 4 is preferably a silicone seal ring; and S4, placing the assembled atomizing assembly 1 into the housing 2, and the sealing members forming a seal between the outer side of the atomizing assembly 1 and the inner wall of the housing 2; specifically, the first sealing member 3 forming a seal between the outer side of the cover 12 and the inner wall of the housing 2, and the second sealing member 4 forming a seal between the outer side of the seat 13 and the inner wall of the housing 2.

The manufacturing method of the atomizing device utilizes the structure of the atomizing assembly 1, the electrode 14 can be electrically connected with the electrical connecting portion 1112 of the heating member 111 easily and reliably, the method is simple and reliable, the strength between the components is good, and the dimensional tolerance can be very accurate, which is very conducive to automatic assembly.

The atomizing device of the present invention may be applied to an electronic cigarette. The liquid storage chamber 21 is configured to store an e-liquid, and the heating member 111 heats and atomizes the e-liquid.

The foregoing embodiments only show exemplary implementations of the present invention, and cannot be understood as a limitation to the patent scope of the present invention. It should be noted that a person of ordinary skill in the art may combine the foregoing technical features randomly and further make several variations and improvements without departing from the idea of this application. Therefore, all equivalent changes and modifications made according to the scope of the claims of the present invention shall fall within the scope of the claims of the present invention.

What is claimed is:

1. An atomizing assembly (1), comprising:
a heating assembly (11);
a liquid conducting member (15);
a cover (12); and
a seat (13),
wherein the heating assembly (11) comprises a heating member (111), wherein one of the cover (12) and the seat (13) is provided with an accommodating chamber (123) open to the other one of the cover (12) and the seat (13), wherein the heating assembly (11) and the liquid conducting member (15) are disposed in the accommodating chamber (123), wherein the liquid conducting member (15) is in contact with the heating member (111), the seat (13) is connected with the cover (12), and the heating assembly (11) is clamped between the cover (12) and the seat (13), wherein the heating member (111) comprises a heating portion (1111) configured for heating and atomizing a liquid and an electrical connecting portion (1112) connected with the heating portion (1111) and configured for electrical connection with an electrode, wherein the heating member (111) is transversely arranged, and the electrical connecting portion (1112) extends outwards, wherein the cover (12) is provided with an electrode connecting hole (124) open longitudinally and configured for an insertion of the electrode (14), wherein the electrical connecting portion (1112) extends transversely or obliquely into an inlet of the electrode connecting hole (124), wherein the electrode (14) is inserted into the electrode connecting hole (124), and bends the electrical connecting portion (1112) into the electrode connecting hole (124) along an opening edge of the electrode connecting hole (124), and wherein the electrical connecting portion (1112) is electrically connected with a side surface of the electrode (14).

2. The atomizing assembly (1) of claim 1, wherein a bottom portion of the cover (12) is provided with the accommodating chamber (123) open longitudinally, wherein the accommodating chamber (123) and the electrode connecting hole (124) are located on a same side of the cover (12), wherein the accommodating chamber (123) comprises a first portion (1231) configured for accommodating the liquid conducting member (15) and a second portion (1232) configured for accommodating the heating assembly (11), wherein the first portion (1231) and the second portion (1232) are connected with each other and arranged from deep to outside in turn, wherein a position, in a second transverse direction (b), of a side wall of the second portion (1232) of the accommodating chamber (123) is provided with an electrical connecting through port (125) for the electrical connecting portion (1112) to protrude from inside to outside, and wherein the electrode connecting hole (124) is disposed outside the electrical connecting through port (125), so that the electrical connecting portion (1112) extends into an opening position of the electrode connecting hole (124) through the electrical connecting through port (125).

3. The atomizing assembly (1) of claim 1, wherein the seat (13) is provided with an electrode through hole (131) corresponding to the electrode connecting hole (124) and extending longitudinally, and wherein the electrode (14) passes through the electrode through hole (131) and is inserted into the electrode connecting hole (124).

4. The atomizing assembly (1) of claim 3, wherein the electrode (14) comprises a head (141) configured for electrically connecting with an external circuit and a rob (142) configured for inserting into the electrode connecting hole (124), wherein a radial dimension of the head (141) is larger than a radial dimension of the rob (142), wherein the rob (142) passes through the electrode through hole (131) and is inserted into the electrode connecting hole (124), and bends the electrical connecting portion (1112) into the electrode connecting hole (124) along the opening edge of the electrode connecting hole (124), wherein the bent portion of the electrical connecting portion (1112) is located between a side wall of the electrode connecting hole (124) and a side surface of the rob (142), and the electrical connecting portion (1112) is electrically connected with the side surface of the rob (142), and wherein the head (141) is exposed outside the seat (13).

5. The atomizing assembly (1) of claim 1, wherein the heating assembly (11) comprises a reinforcing frame (112) that is combined with the heating portion (1111) to support the heating portion (1111), wherein the electrical connecting portion (1112) extends out of the reinforcing frame (112), wherein the reinforcing frame (112) comprises a transverse wall (1121) and a longitudinal wall (1122) surrounding the transverse wall (1121), wherein the heating member (111) is combined with a top of the transverse wall (1121), and the longitudinal wall (1122) is disposed at a bottom of the transverse wall (1121), and wherein the transverse wall (1121) is provided with a vent hole (1123) extending longitudinally, and the longitudinal wall (1122) is provided with a first air vent (1124) extending transversely, so that a gas generated by the heating member (111) flows sequentially through the vent hole (1123) and the first air vent (1124) from inside to outside.

6. The atomizing assembly (1) of claim 5, wherein the reinforcing frame (112) is made of an insulating material, and wherein the reinforcing frame (112) is irremovably combined with the heating member (111), or the reinforcing frame (112) is detachably combined with the heating member (111).

7. The atomizing assembly (1) of claim 5, wherein a transverse dimension of the liquid conducting member (15) is comparable to a transverse dimension of the accommodating chamber (123), and wherein the reinforcing frame (112) supports a bottom of the heating portion (1111), and the liquid conducting member (15) is disposed at a top of the heating portion (1111).

8. The atomizing assembly (1) of claim 5, wherein a bottom of the cover (12) is provided with the accommodating chamber (123) open longitudinally, wherein the accommodating chamber (123) and the electrode connecting hole (124) are located on a same side of the cover (12), wherein the accommodating chamber (123) comprises a first portion (1231) configured for accommodating the liquid conducting member (15) and a second portion (1232) configured for accommodating the heating assembly (11), wherein the first portion (1231) and the second portion (1232) are connected with each other and arranged from deep to outside in turn, wherein a position, in a first transverse direction (a), of a side wall of the second portion (1232) of the accommodating chamber (123) is provided with a second air vent (127) extending transversely, and wherein the second air vent (127) corresponds to the first air vent (1124), so that a gas generated by the heating member (111) flows through the first air vent (1124) and the second air vent (127) in turn from inside to outside.

9. The atomizing assembly (1) of claim 8, wherein an outer side of the cover (12) is provided with a third air vent (128) extending longitudinally, so that the gas generated by the heating member (111) flows through the first air vent (1124), the second air vent (127) and the third air vent (128) in turn.

10. The atomizing assembly (1) of claim 9, wherein the seat (13) is provided with a fourth air vent (132), and the fourth air vent (132) corresponds to the second air vent (127) and is connected with the third air vent (128), so that the gas generated by the heating member (111) flows through the first air vent (1124), the second air vent (127), the fourth air vent (132) and the third air vent (128) in turn.

11. The atomizing assembly (1) of claim 9, wherein a top of the cover (12) is provided with an air passage (129) communicating to the third air vent (128), so that the gas generated by the heating member (111) flows through the first air vent (1124), the second air vent (127), the third air vent (128) and the air passage (129) in turn.

12. The atomizing assembly (1) of claim 10, further comprising:

a first sealing member (3) covering a top of the cover (12) and provided with a fifth air vent (31), wherein the fifth air vent (31) corresponds to the air passage (129) and is connected with the third air vent (128), so that the gas generated by the heating member (111) flows through the first air vent (1124), the second air vent (127), the third air vent (128) and the fifth air vent (31) in turn.

13. The atomizing assembly (1) of claim 12, wherein the first air vent (1124), the second air vent (127), the third air vent (128), the fourth air vent (132) and/or the fifth air vent (31) are notch shaped.

* * * * *